(12) United States Patent
Satoh

(10) Patent No.: US 9,810,450 B2
(45) Date of Patent: Nov. 7, 2017

(54) WATER HEATER

(71) Applicant: NORITZ CORPORATION, Hyogo (JP)

(72) Inventor: Isao Satoh, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 195 days.

(21) Appl. No.: 14/796,764

(22) Filed: Jul. 10, 2015

(65) Prior Publication Data

US 2016/0025376 A1  Jan. 28, 2016

(30) Foreign Application Priority Data

Jul. 25, 2014 (JP) .................................. 2014-151719

(51) Int. Cl.
| | |
|---|---|
| *F24H 8/00* | (2006.01) |
| *F24H 1/16* | (2006.01) |
| *F23L 17/00* | (2006.01) |
| *F23J 15/06* | (2006.01) |

(52) U.S. Cl.
CPC .............. *F24H 8/006* (2013.01); *F23J 15/06* (2013.01); *F23L 17/005* (2013.01); *F24H 1/165* (2013.01); *F23D 2900/14063* (2013.01); *Y02B 30/106* (2013.01); *Y02E 20/363* (2013.01)

(58) Field of Classification Search
CPC ......... F24H 8/006; F24H 1/165; F23L 17/005
See application file for complete search history.

(56) References Cited

U.S. PATENT DOCUMENTS

| | | | | |
|---|---|---|---|---|
| 4,134,450 A | * | 1/1979 | Boyer | ....................... F28B 1/02 165/101 |
| 4,502,626 A | * | 3/1985 | Gerstmann | ........ A61K 51/0476 122/14.3 |
| 4,947,548 A | * | 8/1990 | Bentley | ................... F28F 19/04 29/458 |

(Continued)

FOREIGN PATENT DOCUMENTS

| | | |
|---|---|---|
| JP | 57-112635 A | 7/1982 |
| JP | 58-069742 U | 5/1983 |

(Continued)

OTHER PUBLICATIONS

JP2011021880A—machine translation.*

(Continued)

*Primary Examiner* — Nathaniel Herzfeld
(74) *Attorney, Agent, or Firm* — Studebaker & Brackett PC

(57) ABSTRACT

A water heater includes a burner generating combustion gas, a heat exchanger heating water which flows through the inside, through heat exchange with combustion gas generated in the burner, a fan supplying air to the burner, and a housing storing these components. The water heater has a water entry portion in a top plate of the housing. A water supply pipe for supplying water to the inside of the heat exchanger is connected to the water entry portion. The water entry portion is arranged to be included, in a plane view, in at least one component constituting the heat exchanger and an exhaust path for combustion gas which has passed through the heat exchanger. The component is made of a material having corrosion resistance against drainage water resulting from condensation of combustion gas.

9 Claims, 6 Drawing Sheets

(56) References Cited

U.S. PATENT DOCUMENTS

| | | | | |
|---|---|---|---|---|
| 5,076,494 A | * | 12/1991 | Ripka | F24H 1/48 |
| | | | | 126/101 |
| 6,263,690 B1 | * | 7/2001 | Sokolean | F24F 5/0089 |
| | | | | 165/904 |
| 2005/0039704 A1 | * | 2/2005 | Kobayashi | F24H 8/006 |
| | | | | 122/32 |
| 2008/0083404 A1 | * | 4/2008 | Rappold | F24H 3/087 |
| | | | | 126/524 |
| 2009/0038320 A1 | * | 2/2009 | Hsiao | F24F 5/0017 |
| | | | | 62/59 |

FOREIGN PATENT DOCUMENTS

| | | | |
|---|---|---|---|
| JP | 64-84048 A | | 3/1989 |
| JP | H10-267278 A | | 10/1998 |
| JP | 2000-146304 A | | 5/2000 |
| JP | 2001-241774 A | | 9/2001 |
| JP | 2011021880 A | * | 2/2011 |

OTHER PUBLICATIONS

An Office Action issued by the Japanese Patent Office dated Oct. 27, 2015, which corresponds to Japanese Patent Application No. 2014-151719 and is related to U.S. Appl. No. 14/796,764; with English language partial translation.

* cited by examiner

WATER HEATER

BACKGROUND OF THE INVENTION

Field of the Invention

The present invention relates to a water heater, and particularly to a water heater of a latent heat recovery type capable of heating water by recovering latent heat of combustion gas.

Description of the Background Art

In a water heater, condensate may be generated as air warmed by internally generated heat is cooled at various sites. In particular, at a site where water supplied to the water heater during a hot water supply operation flows into a housing of the water heater (a water entry portion), clean water at a low temperature flows in. Therefore, generation of condensate is likely due to condensation of moisture contained in air at a relatively high temperature around the water entry portion.

In a case that the water entry portion is arranged in a bottom plate of the housing, such condensate merely flows along the bottom plate of the housing. In a case that the water entry portion is provided in a top plate of an instrument, however, condensate may drop onto an electronic component of the water heater and failure may be caused.

Conventionally, in providing a water entry portion in a top plate of an instrument, in order to prevent failure of an electric component due to drop of condensate, the water entry portion has had to be arranged in a position other than a position directly above the electric component or a cover has had to be provided between the water entry portion and the electric component below. For example, Japanese Patent Laying-Open No. 10-267278 describes a cover (a top plate portion) provided above a high voltage generation portion in order to prevent water condensed at an inner surface of a top plate of a housing of a water heater from dropping onto the high voltage generation portion of an igniter.

When such a cover only for preventing drop of condensate from the water entry portion is provided, however, the number of parts increases. Therefore, from an aspect of costs and reduction in size, drop of condensate onto an electric component is desirably prevented without requiring such a cover.

Therefore, it is possible to arrange a component other than an electric component directly under a water entry portion in order to allow drop of condensate from the water entry portion onto that component and to protect the electric component. Here, examples of a component other than an electric component arranged directly under the water entry portion include a part constituting a heat exchanger arranged generally on an upstream side and an exhaust path for combustion gas which has passed through the heat exchanger.

In the inside of a part constituting a heat exchanger and an exhaust path for combustion gas which has passed through the heat exchanger, however, combustion gas is present. When this combustion gas is cooled by condensate, moisture contained in combustion gas is condensed and drainage water is generated. This generated drainage water will corrode the part constituting the heat exchanger and the exhaust path for combustion gas which has passed through the heat exchanger.

SUMMARY OF THE INVENTION

The present invention was made in view of the above-described problems, and an object thereof is to provide a water heater having a water entry portion in a top plate of a housing, capable of suppressing failure of an electric component due to drop of condensate from the water entry portion without restricting a position of the water entry portion or requiring a cover provided only for preventing drop of condensate from the water entry portion and without corrosion of a component.

A water heater according to the present invention includes a burner generating combustion gas, a heat exchanger heating water which flows through the inside, through heat exchange with combustion gas generated in the burner, a fan supplying air to the burner, and a housing storing the burner, the heat exchanger, and the fan.

The water heater according to the present invention has a water entry portion in a top plate of the housing, and a water supply pipe for supplying water to the inside of the heat exchanger is connected to the water entry portion. The water entry portion is arranged to be included, in a plane view, in at least one component constituting the heat exchanger and an exhaust path for combustion gas which has passed through the heat exchanger. The component is made of a material having corrosion resistance against drainage water resulting from condensation of combustion gas.

According to such a feature, even in a water heater having a water entry portion in a top plate of a housing, failure of an electric component due to drop of condensate from the water entry portion can be suppressed without restricting a position of the water entry portion or requiring a cover provided only for preventing drop of condensate from the water entry portion and without corrosion of a component.

In the water heater according to the present invention, preferably, the heat exchanger includes a heat exchanger capable of heating water by recovering latent heat of combustion gas (a secondary heat exchanger). In such a water heater of a latent heat recovery type, drainage water is generated in a secondary heat exchanger due to condensation of vapor in combustion gas. Therefore, conventionally, a component of the secondary heat exchanger and the exhaust path for combustion gas which has passed through the heat exchanger has been made of a material having corrosion resistance against drainage water. Therefore, by merely adjusting arrangement of such a component and the water entry portion, a conventional component can be applied as it is. In addition, since a temperature of a component of the secondary heat exchanger and the exhaust path for combustion gas which has passed through the heat exchanger is not so high as in a primary heat exchanger, even when condensate drops onto the component, evaporation of condensate is less likely and such a defective condition as noise generated at the time of evaporation of condensate can be suppressed.

Preferably, the fan is arranged downstream of the heat exchanger in a direction of flow of combustion gas and constructed to pull air into the burner, and the component constituting the exhaust path is the fan. In such a water heater of an exhaust suction type, normally, the fan is arranged most upstream in the housing of the water heater. Therefore, by arranging the water entry portion directly above the fan, arrangement of parts can readily be designed.

Preferably, a protruding portion protruding upward is provided in a peripheral portion of a top surface of the component including the water entry portion in a plane view and the protruding portion has a discontinuous portion in a prescribed position in the peripheral portion. Thus, condensate generated in the water entry portion and dropped onto the top surface of the component can flow downward from a desired prescribed position in an outer peripheral portion of the top surface.

Preferably, in a top surface of the component including the water entry portion in a plane view, a groove portion is provided in an outer peripheral portion in a prescribed area including the water entry portion in a plane view and a flow path connecting a prescribed position in a peripheral portion of the top surface and the groove portion to each other is further provided. Thus, condensate generated in the water entry portion and dropped onto the top surface of the component can flow downward from a desired prescribed position in an outer peripheral portion of the top surface.

According to the present invention, a water heater having a water entry portion in a top plate of a housing, capable of suppressing failure of an electric component due to drop of condensate from the water entry portion without restricting a position of the water entry portion or requiring a cover provided only for preventing drop of condensate from the water entry portion and without corrosion of a component can be provided.

DESCRIPTION OF THE PREFERRED EMBODIMENTS

Figure 1:
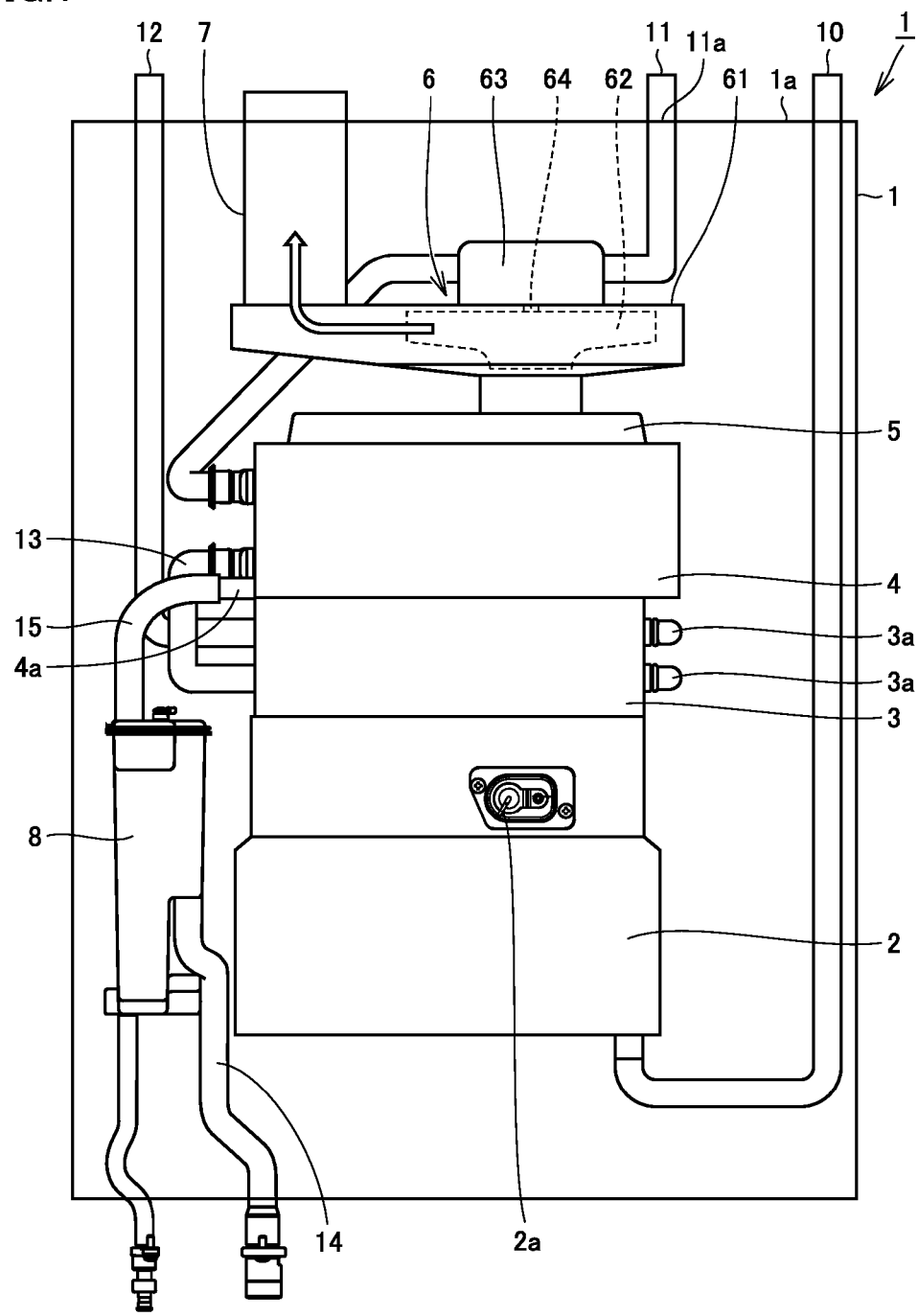
FIG. 1 is a front view schematically showing a construction of a water heater in a first embodiment.

An embodiment of the present invention will be described hereinafter with reference to drawings. In the drawings, the same or corresponding elements have the same reference characters allotted. Relation of such a dimension as a length, a width, a thickness, or a depth is modified as appropriate for clarity and brevity of the drawings and does not represent actual dimensional relation.

First Embodiment

A construction of a water heater in one embodiment of the present invention will be described with reference to FIGS. 1 to 6.

Figure 2:
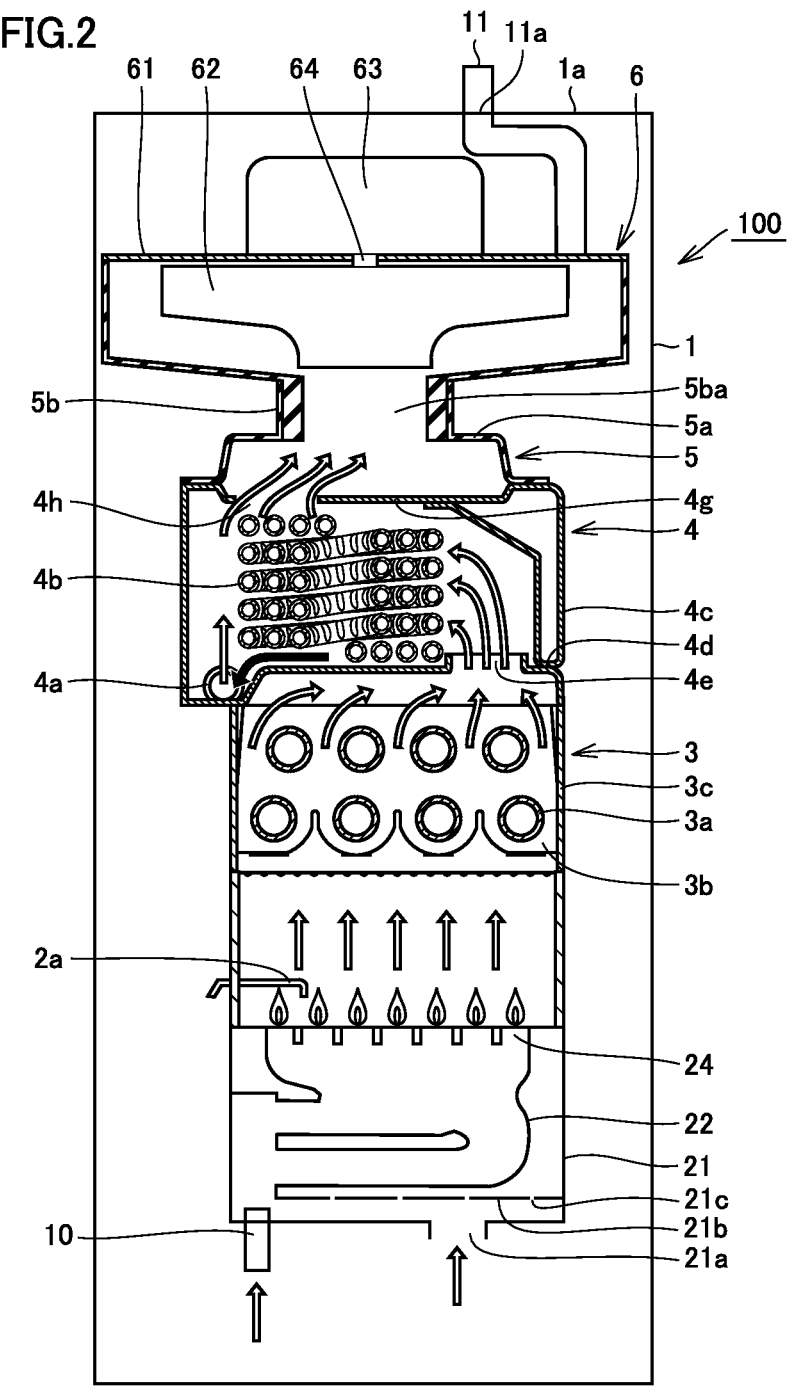
FIG. 2 is a partial cross-sectional side view schematically showing the construction of the water heater shown in FIG. 1.

Referring mainly to FIGS. 1 and 2, a water heater 100 in the present embodiment mainly has a housing 1, a burner 2, a primary heat exchanger 3, a secondary heat exchanger 4, an exhaust box 5, a fan 6, an exhaust tube 7, a drainage water tank 8, and pipes 10 to 15. Since water heater 100 in the present embodiment is of an exhaust suction and combustion type, burner 2, primary heat exchanger 3, secondary heat exchanger 4, and fan 6 are arranged in this order from an upstream side to a downstream side in a flow of combustion gas.

Though a water heater of an exhaust suction type in which fan 6 is arranged downstream of a heat exchanger in a direction of flow of combustion gas and constructed to pull air into a burner is described in the present embodiment, the water heater according to the present invention may be a water heater of a forced exhaust type in which a fan is arranged upstream of a heat exchanger in a direction of flow of combustion gas and constructed to force air into a burner.

(Burner)

Referring mainly to FIGS. 1 and 2, burner 2 is an apparatus for generating combustion gas by burning fuel gas, and includes combustion tubes 22 having a plurality of burner port portions 24. A gas supply pipe 10 is connected to combustion tubes 22. This gas supply pipe 10 serves to supply fuel gas to combustion tubes 22. For example, an electromagnetic valve and a proportional valve (neither of which is shown) are attached to this gas supply pipe 10. Burner 2 is also supplied with air through an opening 21a in a bottom portion of a burner case 21 accommodating combustion tubes 22.

A spark plug 2a is arranged above combustion tubes 22. This spark plug 2a serves to ignite an air fuel mixture injected from burner port portion 24 of combustion tube 22 by generating sparks between the plug and a target (not shown) provided in combustion tube 22, as an ignition apparatus (an igniter) is activated. Burner 2 generates a quantity of heat by burning fuel gas supplied through gas supply pipe 10 (which is called a combustion operation).

(Primary Heat Exchanger)

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, serves to heat water which flows through heat conduction pipe 3a of primary heat exchanger 3 with the quantity of heat generated as a result of the combustion operation of burner 2.

(Secondary Heat Exchanger)

Referring mainly to FIG. 2, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 100 according to the present embodiment thus has secondary heat exchanger 4 of a latent heat recovery type, it is a water heater of the latent heat recovery type.

Secondary heat exchanger 4 mainly has a drainage water discharge port 4a, heat conduction pipes 4b, a sidewall 4c, a bottom wall 4d, and an upper wall 4g. Heat conduction pipes 4b are layered as they are spirally wound. Sidewall 4c, bottom wall 4d, and upper wall 4g are arranged to surround heat conduction pipes 4b.

In secondary heat exchanger 4, water flowing through heat conduction pipes 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. Thus, a water heater of a latent heat recovery type includes a secondary heat exchanger recovering mainly latent heat in addition to a primary heat exchanger recovering mainly sensible heat of combustion gas, and can obtain heat of condensation (latent heat) by condensing vapor contained in combustion gas. Thus, the water heater of the latent heat recovery type can achieve high heat exchange efficiency.

In addition, as latent heat is recovered in secondary heat exchanger 4 and moisture contained in combustion gas is condensed, acidic drainage water is generated. Therefore, a component of secondary heat exchanger 4 and an exhaust path for combustion gas which has passed through the heat exchanger is made of a material having corrosion resistance against drainage water. In water heater 100 in the present embodiment, a component of the exhaust path for combustion gas which has passed through the heat exchanger includes exhaust box 5, a fan case 61, and exhaust tube 7.

Though a material having corrosion resistance against drainage water is not particularly limited, examples thereof include a metal material and a resin material which are resistant to acid. Examples of a metal material resistant to acid include stainless steel and titanium. Examples of a resin material resistant to acid include polyphenylene sulfide (PPS), syndiotactic polystyrene (SPS), polyvinyl chloride (PVC), a phenol resin, an epoxy resin, a silicone resin, a fluorine resin such as polytetrafluoroethylene, an unsaturated polyester resin, a melamine resin, a polycarbonate resin, a methacrylstyrene (MS) resin, a methacrylic resin, an AS resin (a styrene-acrylonitrile copolymer), an ABS resin (an acrylonitrile-butadiene-styrene copolymer synthetic resin), polyethylene, polypropylene, polystyrene, and polyethylene terephthalate (PET).

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipes 4b of secondary heat exchanger 4 is arranged.

As shown with hollow arrows in FIG. 2, combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Upper wall 4g is provided with an opening 4h. This opening 4h allows communication between the space where heat conduction pipes 4b of secondary heat exchanger 4 is arranged and an internal space in exhaust box 5. As shown with hollow arrows in FIG. 2, combustion gas can flow from secondary heat exchanger 4 into the internal space in exhaust box 5 through opening 4h.

Drainage water discharge port 4a is provided in sidewall 4c or bottom wall 4d. This drainage water discharge port 4a opens at a lowest position in the space surrounded by sidewall 4c, bottom wall 4d, and upper wall 4g, which is lower than a lowermost end portion of heat conduction pipes 4b. Thus, drainage water produced in secondary heat exchanger 4 can be guided to drainage water discharge port 4a along bottom wall 4d and sidewall 4c as shown with black arrows in FIG. 2.

(Exhaust Box)

Referring mainly to FIG. 2, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. An internal space of box main body 5a communicates through opening 4h of secondary heat exchanger 4 with the internal space in which heat conduction pipes 4b of secondary heat exchanger 4 is arranged. Fan connection portion 5b is provided so as to protrude from an upper portion of box main body 5a. This fan connection portion 5b has a cylindrical shape, for example, and has an internal space 5ba that communicates with the internal space of box main body 5a.

(Fan)

Referring mainly to FIGS. 1 and 2, fan 6 mainly has fan case 61, an impeller 62, a drive source 63, and a rotation shaft 64. Drive source 63 is provided outside fan case 61 and rotation shaft 64 couples impeller 62 accommodated in fan case 61 and drive source 63 provided outside fan case 61 to each other. Thus, impeller 62 can rotate around rotation shaft 64 as it receives drive force from drive source 63.

Fan 6 is arranged downstream of the heat exchanger (the primary heat exchanger and the secondary heat exchanger) in the direction of flow of combustion gas and constructed to pull air into burner 2. Fan 6 is connected to exhaust tube 7 located outside water heater 100 in order to suction combustion gas which has passed through secondary heat exchanger 4 (of which heat has been exchanged in secondary heat exchanger 4) and to emit combustion gas to the outside of water heater 100. Exhaust tube 7 is arranged outside water heater 100 and connected on an outer peripheral side of fan case 61. Therefore, combustion gas emitted to the outer peripheral side of impeller 62 can be emitted out of water heater 100 through exhaust tube 7.

Fan 6 is thus located downstream of exhaust box 5 and secondary heat exchanger 4 in the flow of combustion gas. In water heater 100, exhaust box 5, fan case 61, and exhaust tube 7 are components constituting the exhaust path for combustion gas which has passed through the heat exchanger (secondary heat exchanger 4).

(Drainage Water Tank)

In the water heater of the latent heat recovery type, drainage water (condensate) resulting from condensation of vapor in combustion gas within the secondary heat exchanger is generated. Here, combustion gas contains a nitrogen oxide generated as a result of reaction between nitrogen and oxygen in air caused by combustion or a sulfur oxide generated as a result of reaction between a sulfur component in fuel and oxygen caused by combustion. Since drainage water thus generated in the secondary heat exchanger exhibits strong acidity owing to such a nitrogen oxide or sulfur oxide, normally, it is discharged to the outside after it is neutralized by a neutralizer disposed in the drainage water tank.

Referring mainly to FIGS. 1 and 2, in order to discharge drainage water in secondary heat exchanger 4 to the outside in the water heater in the present embodiment, drainage water discharge port 4a of secondary heat exchanger 4 and drainage water tank 8 are connected by pipe 15. Drainage water discharge piping 14 is connected to drainage water tank 8 and leads to the outside of water heater 100. Acid drainage water stored in drainage water tank 8 is temporarily stored in the internal space of drainage water tank 8, and thereafter usually discharged through drainage water discharge piping 14 to the outside of water heater 100.

(Pipe, Water Entry Portion)

Referring mainly to FIGS. 1 and 2, gas supply pipe 10 is connected to burner 2. A water supply pipe 11 is connected to one end of heat conduction pipes 4b of secondary heat exchanger 4 and a hot water delivery pipe 12 is connected to one end of heat conduction pipe 3a of primary heat exchanger 3. The other end of heat conduction pipe 3a of primary heat exchanger 3 and the other end of heat conduction pipes 4b of secondary heat exchanger 4 are connected to each other through a connection pipe 13.

Water supply pipe 11 is connected to a water entry portion 11a of a top plate 1a of housing 1 and leads to the outside. Each of gas supply pipe 10 and hot water delivery pipe 12 also leads to the outside, for example, in a top portion of housing 1 of water heater 100. Burner 2, primary heat exchanger 3, secondary heat exchanger 4, exhaust box 5, fan 6, and drainage water tank 8 are arranged in housing 1.

Figure 3:
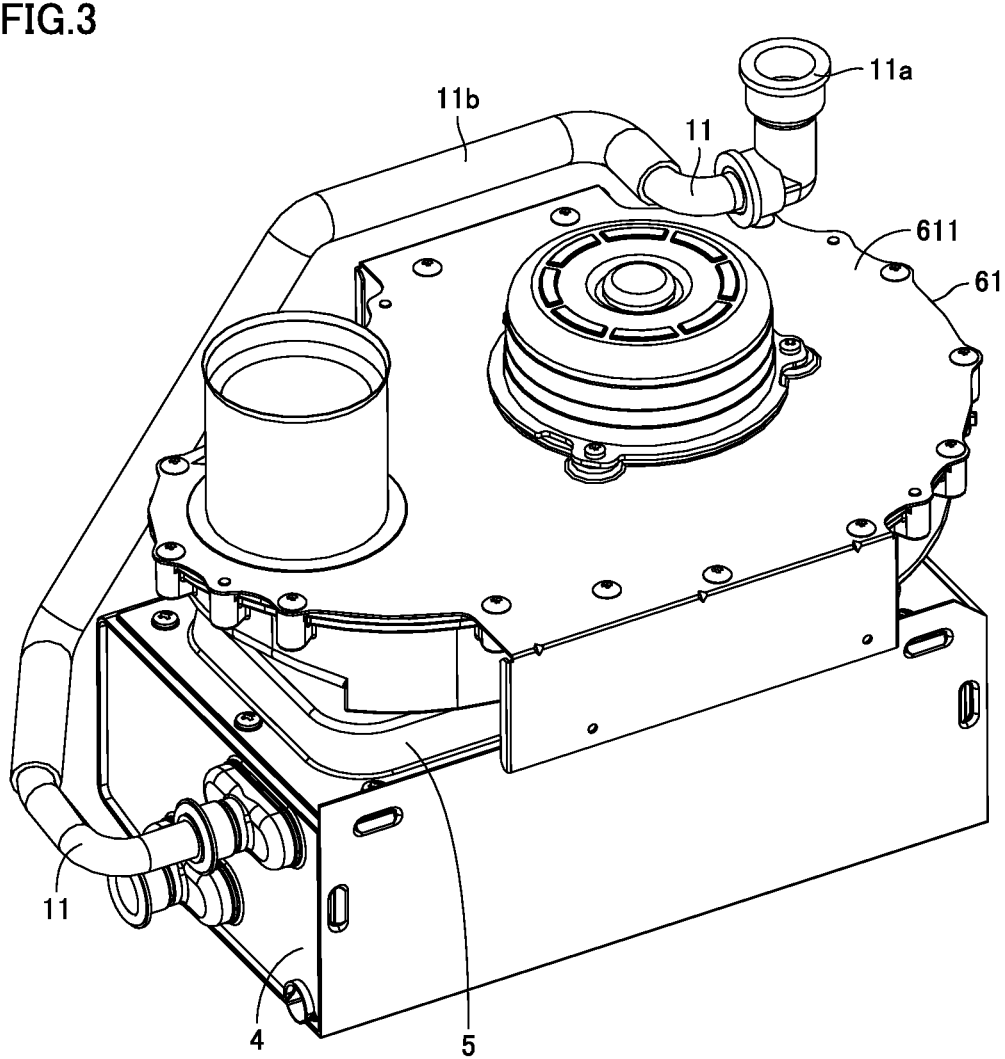
FIG. 3 is a perspective view schematically showing arrangement of a water entry portion in the water heater in the first embodiment.
Figure 4:
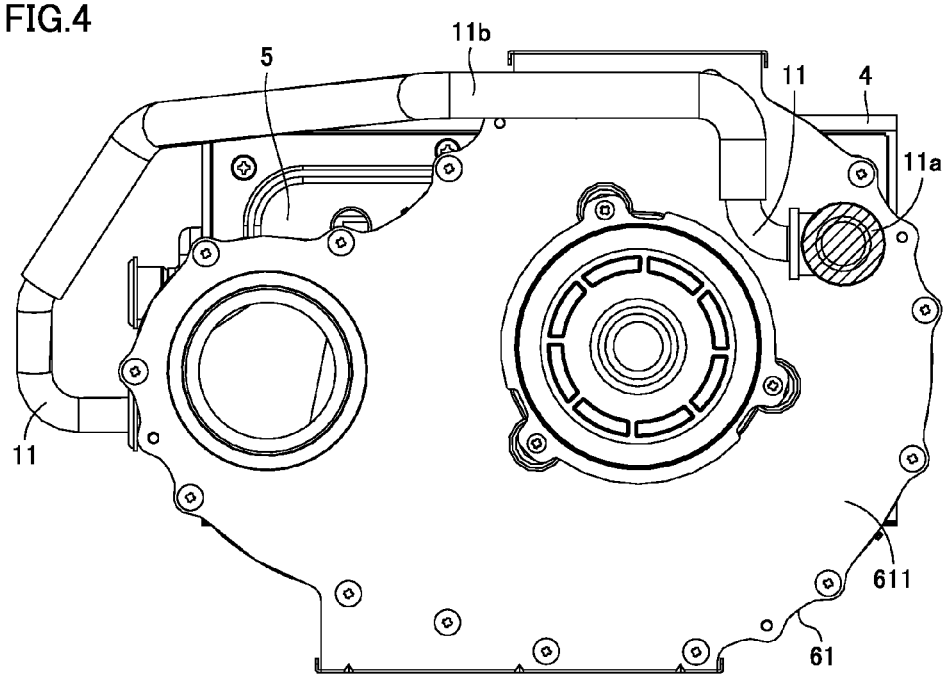
FIG. 4 is a top view schematically showing arrangement relation between the water entry portion and a fan case in the water heater in the first embodiment.

Referring mainly to FIGS. 3 and 4, water entry portion 11a of top plate 1a is arranged to be included in a top surface 611 of fan case 61 in a plane view (a plane view when viewed in a vertical direction while the water heater is installed). Fan case 61 representing a component constituting the exhaust path for combustion gas which has passed through the heat exchanger (secondary heat exchanger 4) is made of a material having corrosion resistance against drainage water resulting from condensation of combustion gas as described above.

Though condensate may be generated at a surface of water supply pipe 11 in a portion other than a portion around water entry portion 11a, in order to suppress this, water supply pipe 11 is covered with a dropproof seal 11b having a heat-insulating effect. Here, at least an exposed portion of water supply pipe 11 (a portion between water entry portion 11a and dropproof seal 11b) is arranged to be included in top surface 611 of fan case 61 in a plane view. Though the entire water supply pipe 11 in housing 1 has conventionally had to be covered with dropproof seal 11b in order to prevent drop of condensate generated in water supply pipe 11, in the water heater in the present embodiment, drop of condensate onto an electronic component can be prevented even though no dropproof seal 11b is provided in a portion included in top surface 611 in a plane view of water supply pipe 11.

Figure 5:
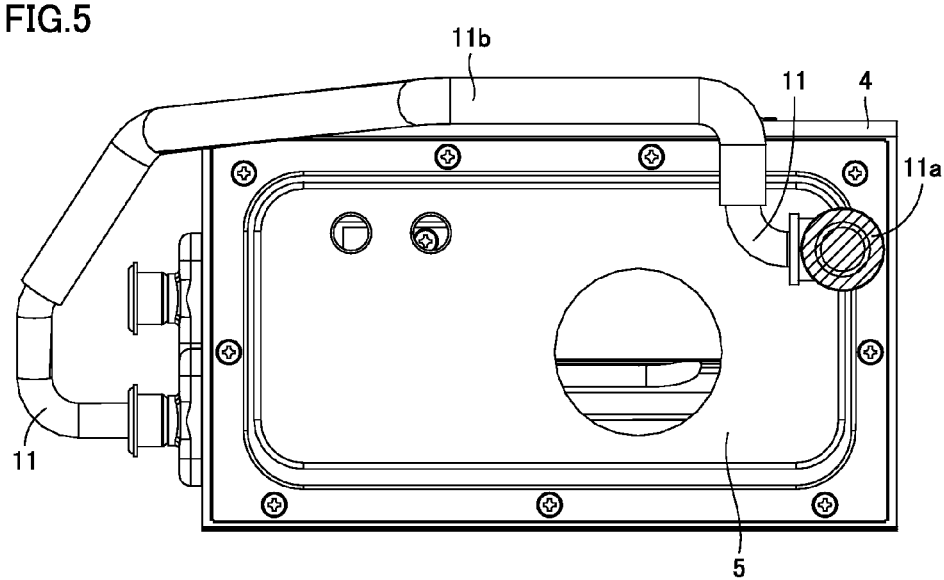
FIG. 5 is a top view schematically showing arrangement relation between the water entry portion and an exhaust box in a modification of the water heater in the first embodiment.
Figure 6:
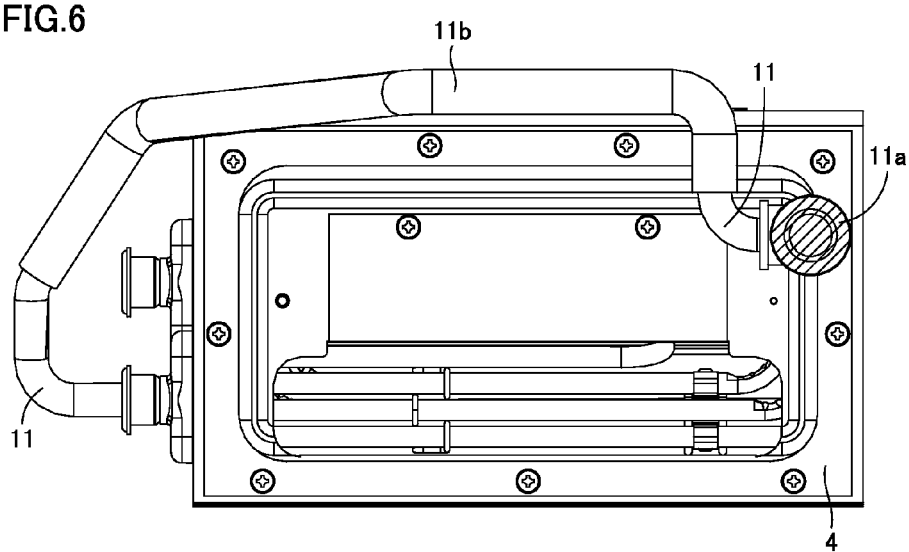
FIG. 6 is a top view schematically showing arrangement relation between the water entry portion and a secondary heat exchanger in the modification of the water heater in the first embodiment.

FIGS. 5 and 6 are each a top view schematically showing arrangement relation of water entry portion 11a with secondary heat exchanger 4 and exhaust box 5 in a modification of the water heater in the present embodiment. In the water heater in the present embodiment, as shown in FIGS. 5 and 6, so long as water entry portion 11a is arranged to be included, in a plane view, in exhaust box 5 and secondary heat exchanger 4 (FIG. 5) or in secondary heat exchanger 4 (FIG. 6), arrangement or a shape of fan 6 may be varied such that water entry portion 11a is not included in fan case 61 in a plane view. Even with such variation, since condensate generated in water entry portion 11a can drop on at least one of secondary heat exchanger 4 and exhaust box 5 made of a corrosion-resistant material, failure of an electric component due to drop of condensate from water entry portion 11a can be suppressed as in the present embodiment, without requiring provision of a cover and without corrosion of a component.

Functions and effects of the water heater in the present embodiment will now be described. Initially, water heater 100 in the present embodiment has water entry portion 11a in top plate 1a of housing 1, and water supply pipe 11 for supplying water to the inside of the heat exchanger is connected to water entry portion 11a. Water entry portion 11a is arranged to be included in at least one component constituting the heat exchanger and the exhaust path for combustion gas which has passed through the heat exchanger and the component is made of a material having corrosion resistance against drainage water resulting from condensation of combustion gas.

According to such a feature, by allowing condensate generated in water entry portion 11a where generation of condensate is particularly likely to drop onto a component other than an electric component, drop of condensate onto the electric component and failure of the electric component due to drop of condensate can be suppressed without restricting a position of water entry portion 11a or requiring a cover provided only for preventing drop of condensate from water entry portion 11a. Though an electric component is not particularly limited, examples thereof include a proportional valve, a connector, an actuator, and a wire.

A component on which condensate drops is a part constituting the heat exchanger and the exhaust path for combustion gas which has passed through the heat exchanger, and combustion gas is present therein. Therefore, when such a component is cooled by drop of condensate, drainage water is generated in the component. Generated drainage water exhibits strong acidity, and for example, is corrosive to a material (such as copper) conventionally used for a heat exchanger of a water heater which is not of a latent heat recovery type. In the present embodiment, however, a component in which drainage water is generated due to drop of condensate is made of a corrosion-resistant material, and hence corrosion of a component does not take place.

Therefore, according to water heater 100 in the present embodiment, even in the water heater having water entry portion 11a in top plate 1a of housing 1, failure of an electric component due to drop of condensate from water entry portion 11a can be suppressed without restricting a position of the water entry portion or requiring a cover provided only for preventing drop of condensate from the water entry portion and without corrosion of a component.

In water heater 100 in the present embodiment, the heat exchanger includes secondary heat exchanger 4 capable of heating water by recovering latent heat of combustion gas. In such a water heater of a latent heat recovery type, drainage water is generated in secondary heat exchanger 4 during a normal operation. Therefore, conventionally, secondary heat exchanger 4 as well as exhaust box 5, fan case 61, and exhaust tube 7 constituting the exhaust path for combustion gas which has passed through secondary heat exchanger 4 have been made of a material having corrosion resistance against drainage water. Therefore, by merely adjusting arrangement relation between such a component and water entry portion 11a, a conventional component can be applied as it is and condensate generated in water entry portion 11a can drop onto such a component. In addition, since a temperature of a component of the secondary heat exchanger and the exhaust path for combustion gas which has passed through the heat exchanger is not so high as in a primary heat exchanger, even when condensate drops onto the component, evaporation of condensate is less likely and such a defective condition as noise generated at the time of evaporation of condensate can be suppressed.

In water heater 100 in the present embodiment, fan 6 is arranged downstream of the heat exchanger (secondary heat exchanger 4) in a direction of flow of combustion gas and constructed to pull air into burner 2, and this fan 6 represents one of components of the exhaust path. In such a water heater of an exhaust suction type, normally, fan 6 is arranged most upstream in housing 1 of water heater 100. Therefore, by arranging the water entry portion directly above fan case 61, arrangement of parts can readily be designed.

Second Embodiment

Figure 7:
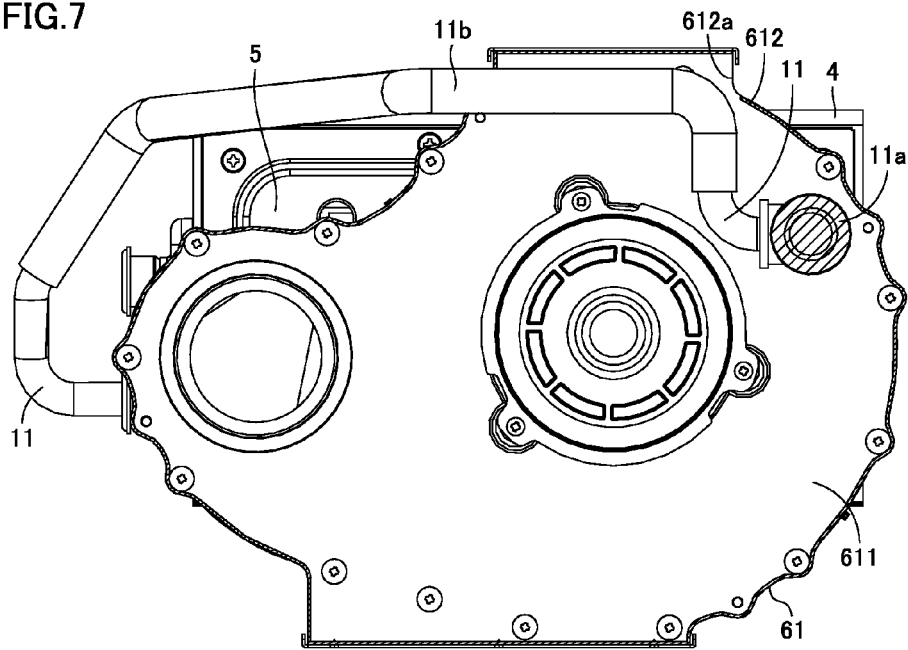
FIG. 7 is a top view schematically showing a construction of a fan case in a water heater in a second embodiment.

A construction of a water heater in the present embodiment will be described with reference to FIG. 7. The water heater in the present embodiment is different from that in the first embodiment in that a protruding portion 612 is provided in a peripheral portion of top surface 611 of fan case 61. Protruding portion 612 has a discontinuous portion 612*a* in a prescribed position in the peripheral portion of top surface 611. Since the present embodiment is otherwise the same as the first embodiment, redundant description will not be provided.

In the prescribed position in discontinuous portion 612*a*, condensate which has dropped onto top surface 611 of fan case 61 can flow downward. Preferably, a position of this discontinuous portion 612*a* is not directly above an electric component (not shown). When another component (such as secondary heat exchanger 4) is interposed between this discontinuous portion 612*a* and the electric component, discontinuous portion 612*a* may be positioned above the electric component. The discontinuous portion may be a portion where protruding portion 612 is absent or a portion of which part is missing or a portion provided with a hole.

For example, when an electronic component is arranged mainly on a front side of housing 1 and not proximate to a back surface and a bottom plate of housing 1, preferably, discontinuous portion 612*a* is provided in a position proximate to the back surface of housing 1 and condensate which has dropped onto top surface 611 of fan case 61 flows downward along an inner side of the back surface of housing 1. Thus, failure of an electric component due to drop of condensate can more reliably be suppressed.

According to the water heater in the present embodiment, condensate generated in the water entry portion and dropped onto the top surface of the component can flow downward from a desired prescribed position in an outer peripheral portion of the top surface and failure of an electric component due to drop of condensate can more reliably be suppressed.

Third Embodiment

Figure 8:
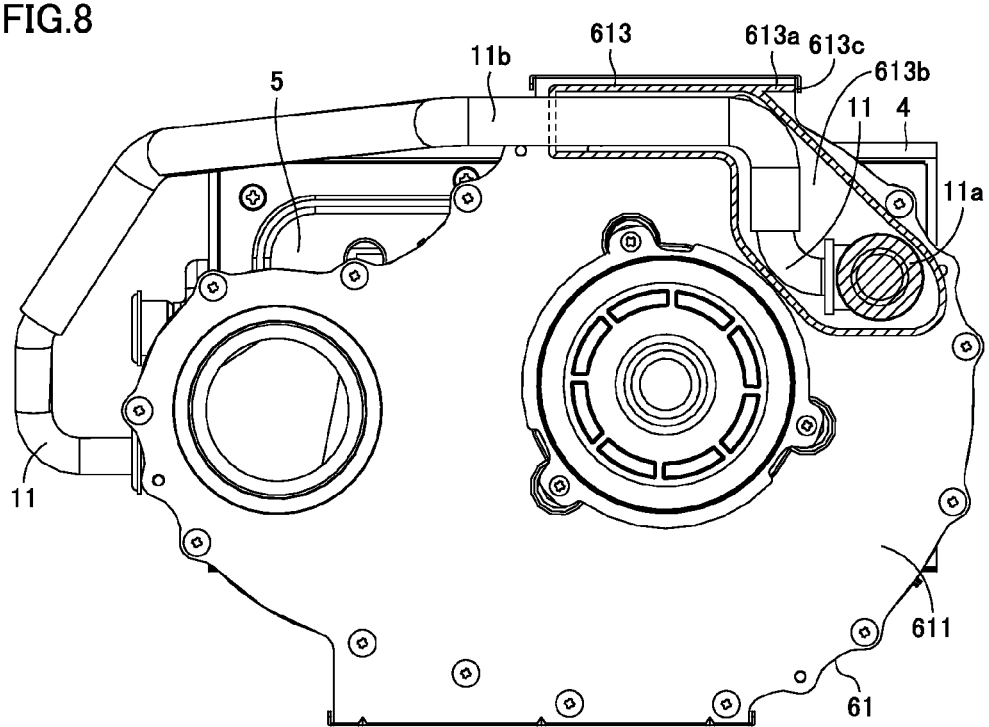
FIG. 8 is a top view schematically showing a construction of a fan case in a water heater in a third embodiment.

A construction of a water heater in the present embodiment will be described with reference to FIG. 8. The water heater in the present embodiment is different from that in the first embodiment in that, in top surface 611 of fan case 61, a groove portion 613 is provided in an outer peripheral portion of a prescribed area 613*b* including water entry portion 11*a* in a plane view and a flow path 613*a* connecting a prescribed position 613*c* in the peripheral portion of top surface 611 and groove portion 613 to each other is further provided. Since the present embodiment is otherwise the same as the first embodiment, redundant description will not be provided.

At prescribed position 613*c*, condensate which has dropped on prescribed area 613*b* on top surface 611 of fan case 61 can flow downward. Preferably, this prescribed position 613*c* is not directly above an electric component (not shown). When another component (such as secondary heat exchanger 4) is interposed between this prescribed position 613*c* and the electric component, prescribed position 613*c* may be above the electric component.

For example, when an electronic component is arranged mainly on a front side of housing 1 and not proximate to a back surface and a bottom plate of housing 1, preferably, flow path 613*a* is provided at prescribed position 613*c* proximate to the back surface of housing 1 and condensate which has dropped onto prescribed area 613*b* on top surface 611 of fan case 61 flows downward along an inner side of the back surface of housing 1. Thus, failure of an electric component due to drop of condensate can more reliably be suppressed.

A form of top surface 611 of fan case 61 in the water heater in the present embodiment and a form of top surface 611 of fan case 61 in the water heater in the second embodiment may be combined with each other.

According to the water heater in the present embodiment, condensate generated in the water entry portion and dropped onto the top surface of the component can flow downward from a desired prescribed position in an outer peripheral portion of the top surface and failure of an electric component due to drop of condensate can more reliably be suppressed.

Although embodiments of the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A water heater, comprising:
   a burner generating combustion gas;
   a heat exchanger heating water which flows through inside, through heat exchange with combustion gas generated in the burner;
   a fan supplying air to the burner; and
   a housing storing the burner, the heat exchanger, and the fan,
   the water heater having a water entry portion in a top plate of the housing, a water supply pipe for supplying water to inside of the heat exchanger being connected to the water entry portion,
   the water entry portion being arranged to be included, in a plane view, in at least one component constituting the heat exchanger and an exhaust path for combustion gas which has passed through the heat exchanger, and
   the component being made of a material having corrosion resistance against drainage water resulting from condensation of combustion gas, wherein
   a temperature of a part of the component, on which condensate generated in the water entry portion drops, is a temperature at which noise generation at the time of evaporation of the condensate is suppressed.
2. The water heater according to claim 1, wherein
   the heat exchanger includes a heat exchanger capable of heating water by recovering latent heat of combustion gas.
3. The water heater according to claim 1, wherein
   the fan is arranged downstream of the heat exchanger in a direction of flow of combustion gas and constructed to pull air into the burner, and
   the component constituting the exhaust path is the fan.
4. The water heater according to claim 1, wherein
   a protruding portion protruding upward is provided in a peripheral portion of a top surface of the component including the water entry portion in a plane view and the protruding portion has a discontinuous portion in a prescribed position in the peripheral portion.

5. The water heater according to claim 2, wherein
a protruding portion protruding upward is provided in a peripheral portion of a top surface of the component including the water entry portion in a plane view and the protruding portion has a discontinuous portion in a prescribed position in the peripheral portion.

6. The water heater according to claim 3, wherein
a protruding portion protruding upward is provided in a peripheral portion of a top surface of the component including the water entry portion in a plane view and the protruding portion has a discontinuous portion in a prescribed position in the peripheral portion.

7. The water heater according to claim 1, wherein
in a top surface of the component including the water entry portion in a plane view, a groove portion is provided in an outer peripheral portion in a prescribed area including the water entry portion in a plane view and a flow path connecting a prescribed position in a peripheral portion of the top surface and the groove portion to each other is further provided.

8. The water heater according to claim 2, wherein
in a top surface of the component including the water entry portion in a plane view, a groove portion is provided in an outer peripheral portion in a prescribed area including the water entry portion in a plane view and a flow path connecting a prescribed position in a peripheral portion of the top surface and the groove portion to each other is further provided.

9. The water heater according to claim 3, wherein
in a top surface of the component including the water entry portion in a plane view, a groove portion is provided in an outer peripheral portion in a prescribed area including the water entry portion in a plane view and a flow path connecting a prescribed position in a peripheral portion of the top surface and the groove portion to each other is further provided.

* * * * *